United States Patent
Ueta et al.

(10) Patent No.: US 9,932,001 B2
(45) Date of Patent: Apr. 3, 2018

(54) VEHICULAR POWER SOURCE CONTROLLER

(71) Applicant: YAZAKI CORPORATION, Tokyo (JP)

(72) Inventors: Keisuke Ueta, Susono (JP); Akinori Maruyama, Susono (JP); Yoshihide Nakamura, Susono (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 246 days.

(21) Appl. No.: 14/798,689

(22) Filed: Jul. 14, 2015

(65) Prior Publication Data

US 2015/0314741 A1    Nov. 5, 2015

Related U.S. Application Data

(63) Continuation of application No. PCT/JP2013/081296, filed on Nov. 20, 2013.

(30) Foreign Application Priority Data

Jan. 23, 2013 (JP) .................................. 2013-009911

(51) Int. Cl.
*B60L 1/00* (2006.01)
*B60L 3/00* (2006.01)
(Continued)

(52) U.S. Cl.
CPC ............ *B60R 16/03* (2013.01); *B60Q 1/1407* (2013.01); *B60R 16/0231* (2013.01); *H05B 37/032* (2013.01)

(58) Field of Classification Search
CPC ..... B60R 16/023; B60R 16/03; H05B 37/032; B60Q 1/1407
See application file for complete search history.

(56) References Cited

U.S. PATENT DOCUMENTS 4,979,066 A * 12/1990 Kawata ..................... G05F 1/66
323/276
6,455,949 B1 * 9/2002 Blauensteiner ......... H02J 9/061
307/10.1
(Continued)

FOREIGN PATENT DOCUMENTS

EP        1 783 886 A2    5/2007
JP     2005-253125 A     9/2005
(Continued)

OTHER PUBLICATIONS

Communication dated Sep. 6, 2016 from the Japanese Patent Office in counterpart Application No. 2013-009911.
(Continued)

*Primary Examiner* — Jared Fureman
*Assistant Examiner* — Esayas Yeshaw
(74) *Attorney, Agent, or Firm* — Sughrue Mion, PLLC

(57) ABSTRACT

A vehicular power source controller is designed so that when there is abnormal action in a microprocessor and an abnormal fuse state cannot be determined from the current of a load detected by a current sensor circuit, power supply to the load cannot be turned on and off by the operation of a combination switch corresponding to the load, but can be turned on and off by the operation of an ignition switch. It is thereby possible to prevent continuing power supply to the load when the combination switch is turned on during the abnormal action of the microprocessor, and battery exhaustion can be suppressed. Power supply to the load cannot be turned on and off by the operation of the combination switch during the abnormal action of the microprocessor, and an operator is easily made aware of the abnormal action of the microprocessor.

2 Claims, 2 Drawing Sheets

(51) Int. Cl.
*H02G 3/00* (2006.01)
*B60R 16/03* (2006.01)
*B60R 16/023* (2006.01)
*B60Q 1/14* (2006.01)
*H05B 37/03* (2006.01)

(56) References Cited

U.S. PATENT DOCUMENTS

| | | | |
|---|---|---|---|
| 8,766,609 | B2 | 7/2014 | Babasaki et al. |
| 2002/0000910 | A1* | 1/2002 | Wilkerson ............ B60W 40/00 340/457.1 |
| 2002/0147530 | A1* | 10/2002 | Tamagawa ............... B60K 6/48 701/22 |
| 2003/0007305 | A1* | 1/2003 | Yugou ................... B60L 3/0023 361/179 |
| 2005/0216135 | A1 | 9/2005 | Sayama et al. |
| 2009/0088920 | A1 | 4/2009 | Ohno et al. |
| 2009/0316320 | A1 | 12/2009 | Maeda et al. |
| 2010/0014195 | A1 | 1/2010 | Takahashi |
| 2011/0043180 | A1 | 2/2011 | Babasaki et al. |
| 2011/0095738 | A1* | 4/2011 | Fukuhara ......... H03K 17/04123 323/282 |
| 2012/0330538 | A1* | 12/2012 | Spjuth ................ F02N 11/0866 701/113 |
| 2013/0063154 | A1* | 3/2013 | Nakajima ............. B60L 3/0046 324/550 |
| 2013/0200690 | A1* | 8/2013 | Rini ....................... H02J 7/0031 307/9.1 |
| 2015/0210232 | A1* | 7/2015 | Kanzaki ................ B60R 16/033 701/36 |
| 2015/0236501 | A1* | 8/2015 | Lee .......................... H02H 3/06 361/57 |
| 2016/0248347 | A1* | 8/2016 | Shinohara ................. H02P 3/12 |

FOREIGN PATENT DOCUMENTS

| | | | |
|---|---|---|---|
| JP | 2009-126413 | A | 6/2009 |
| JP | 2012-70045 | A | 4/2012 |
| JP | 5037414 | B2 | 9/2012 |

OTHER PUBLICATIONS

Communication dated Sep. 21, 2016 from the European Patent Office in counterpart Application No. 13873128.6.
International Search Report for PCT/JP2013/081296 dated Feb. 25, 2014.
Written Opinion for PCT/JP2013/081296 dated Feb. 25, 2014.

* cited by examiner

VEHICULAR POWER SOURCE CONTROLLER

CROSS REFERENCE TO RELATED APPLICATIONS

This application is a continuation of International Application No. PCT/JP2013/081296, filed Nov. 20, 2013, and based upon and claims the benefit of priority from Japanese Patent Application No. 2013-009911, filed Jan. 23, 2013, the entire contents of all of which are incorporated herein by reference.

TECHNICAL FIELD

The present application relates to a vehicular power source controller which controls to turn on and off a semiconductor switching element interposed between a power source and a load of a vehicle, for controlling power supply from the power source to the load.

BACKGROUND ART

Conventionally, a vehicle is equipped with a fuse function to disconnect a load from a power source when the overcurrent or the like occurs. Recently, additionally, there is growing demand for miniaturize a junction box (J/B) or a relay box (R/B) in a vehicle equipped with the fuse function. Correspondingly, there is a glowing tendency of replacing a mechanical fuse with a semiconductor switching element to provide a vehicle with the fuse function.

As the technique of realizing the fuse function by a semiconductor switching element, for instance, there has been conventionally proposed a technique of controlling a semiconductor switching element for switching on and off the power supply to a load by a vehicular ECU (Electronic Control Unit) connected to the semiconductor switching element.

According to this proposal, a microprocessor in an ECU receives, from the other ECU, a switch signal in association with switching-on/off operation of a switch connected to the other ECU. Then, based on the received switch signal, the power supply to the load is switched on and off by the semiconductor switching element, in association with the switching-on/off operation of the switch.

Thus, the microprocessor judges whether or not there is an abnormal fuse state where the power supply to the load should be restricted, from a load current (current flowing through the load) detected by a sensing circuit in the ECU. Then, if it is judged that there exists such an abnormal fuse state, the microprocessor controls to turn on/off the semiconductor switching element in preference to a switch signal brought from the other ECU, so that the power supply to the load is suppressed.

It is noted that the ECU includes an analogue circuit for turning on/off the semiconductor switching element in association with the switch signal transmitted from the other ECU, separately. The function of this analogue circuit is invalidated during the normal functioning of the microprocessor to output an output signal periodically.

Therefore, when the microprocessor becomes impossible to control to turn on/off the semiconductor switching element due to runaway or the like, it is possible to turn on/off the semiconductor switching element in accordance with the content of the switch signal by the analogue circuit which is validated with the shutdown of the output signal from the microprocessor (see JP 5037414 B).

SUMMARY

In this way, according to the above-mentioned proposal, even if the microprocessor has an abnormality so that it becomes impossible to judge whether or not there arises an abnormal fuse state, the power supply to the load can be maintained by turning on and off the semiconductor switching element in association with the operation of the switch. Thus, in case that the power to be supplied to the load derives from a vehicular battery, there is a possibility that even if the abnormal fuse state arises, the power supply to the load might be maintained depending on the operation of the switch, causing the battery to be exhausted.

In the above-mentioned proposal, additionally, the power is supplied to the load in synchronization with the operation of the switch even if the microprocessor has an abnormality in operation. For this reason, it is impossible to allow an operator of the switch (particularly, a driver of the relevant vehicle) to recognize a vehicular abnormality (occurrence of an abnormality in the microprocessor) by a situation that the switching-on/off of the power supply to the load is not synchronized with the operation of the switch. Thus, there is a possibility that it becomes difficult to allow the operator to recognize the abnormality of the vehicle.

Accordingly, in order to allow the semiconductor switching element, which switches on/off the power supply to the load in association with the operation of the switch, to operate in a manner that "fuse" function of suppressing the power supply to the load could be accomplished if it is judged, based on a load current, that there arises an abnormal fuse state where the power supply to the load has to be interrupted, it is important to guarantee both prevention of battery exhaustion and easy recognizability for the occurrence of a vehicular abnormality.

Under the above-mentioned situation, an object of the present invention is to provide a vehicular power controller which is capable of guaranteeing both prevention of battery exhaustion and easy recognizability for the occurrence of a vehicular abnormality, in realizing the fuse function using a semiconductor switching element.

In order to attain the above-mentioned object, a vehicular power source controller according to a first aspect of the present invention includes: a semiconductor switching element; a control unit configured to turn on and off the semiconductor switching element based on a switch signal inputted in association with an operation of a first switch compatible with a load of a vehicle, thereby switching on and off power supply from a power source of the vehicle to the load, and turn on and off the semiconductor switching element independently of the switch signal when a current flows through the load in an abnormal fuse state where the power supply to the load has to be suppressed, thereby suppressing the power supply to the load; and a backup control circuit configured to turn on and off the semiconductor switching element in synchronization with turning-on/off of a second switch incompatible with the load, based on the other switch signal which is inputted in association with an operation of the second switch when the control unit has an abnormality in operation, thereby switching on and off the power supply to the load.

With the constitution mentioned above, when there arises an abnormality where the control unit cannot turn on and off the semiconductor switching element, the backup control circuit turns on and off the semiconductor switching element based on a signal in association with the operation to turn on and off the second switch, allowing the power supply to the load to be turned on and off.

Accordingly, during the occurrence of abnormality in the control unit, even if operating the first switch corresponding to the load, it is impossible to supply the load with power. Consequently, it is possible to suppress battery exhaustion as a result that the load continues to be supplied with power despite the occurrence of an abnormal fuse state and also possible to allow an operator of the switch to be easily aware of a vehicular abnormal state where the abnormal fuse state cannot be judged.

For this reason, it is possible to guarantee both prevention of battery exhaustion and easy recognizability for the occurrence of a vehicular abnormality, in realizing the fuse function using a semiconductor switching element.

The second switch may be an ignition switch of the vehicle, and the backup control circuit may be configured to turn on and off the semiconductor switching element in synchronization with turning-on/off of the ignition switch, based on an ignition switch signal which is inputted in association with the operation of the ignition switch.

The ignition switch of the vehicle is operated when switching between a condition enabling vehicular electrical components to be supplied with power and a condition disenabling the vehicular electrical components to be supplied with power except for dark current. Then, on the circuit, the ignition switch is closer to the power source than a switch corresponding to the load. Thus, whenever supplying the load with power, the ignition switch is operated to be turned on previously.

That is, it is noted that although the ignition switch is not provided for switching on and off the power supply to the load directly, the ignition switch is more relevant to the load than any other switches except for the first switch in association with the load, for the above reason that the ignition switch is always operated to be turned on when supplying the load with power.

By defining the ignition switch as "the second switch" to be operated to switch on and off the power supply to the load when there arises an abnormality in the control unit, it is possible to allow an operator, who is aware of the occurrence of abnormality in the control unit, to easily recall which switch to be operated to turn on and off the power supply to the load.

According to the vehicular power source controller related to the aspect of the present invention, it is possible to guarantee both prevention of battery exhaustion and easy recognizability for the occurrence of a vehicular abnormality, in realizing the fuse function using a semiconductor switching element.

DESCRIPTION OF EMBODIMENTS

Figure 1:
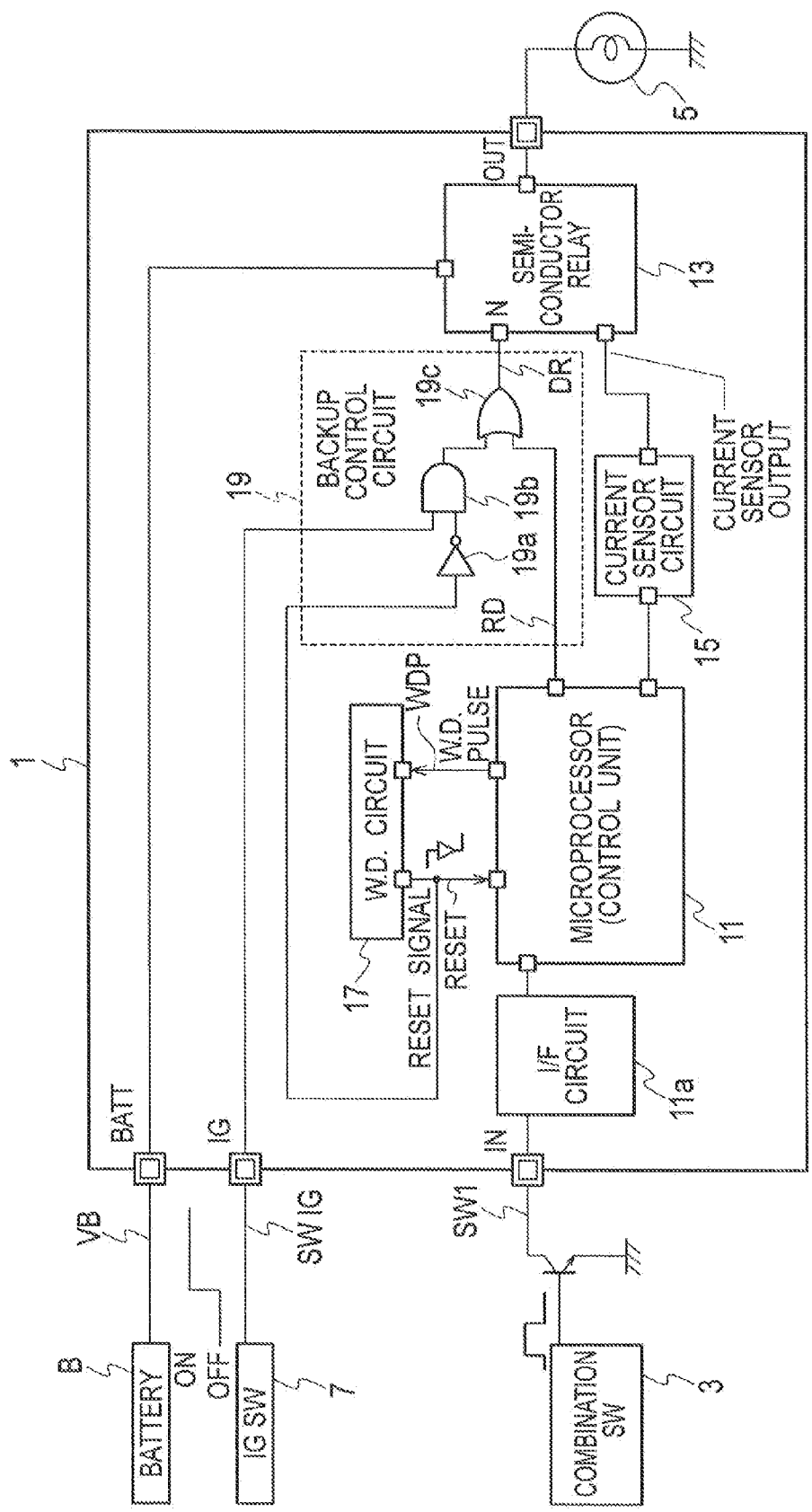
FIG. 1 is a circuit diagram illustrating the fundamental constitution of a power source controller according to an embodiment.

An embodiment will be described with reference to drawings, below. FIG. 1 is a circuit diagram illustrating the fundamental constitution of a power source controller 1 according to the embodiment.

The power source controller (vehicular power source controller) 1 is provided to switch on and off the supply of power VB from a vehicular battery B to a load 5, such as headlights, by turning on and off a semiconductor relay 13 as a semiconductor switching element, based on a switch signal SW1 inputted in association with the operation of turning on and off a combination switch (first switch) 3 mounted on a vehicle (not illustrated).

Additionally, when the power source controller 1 judges, from a current (load current) flowing through the load 5, that the load is in an abnormal fuse state where the power supply to the load 5 has to be suppressed, the controller 1 turns on and off the semiconductor relay 13 independently of the switch signal SW1 to suppress the supply of power VB from the battery B to the load 5.

Therefore, the power source controller 1 includes a microprocessor (control unit) 11, a semiconductor relay 13, a current sensor circuit 15, a watchdog (WD) circuit 17, and a backup control circuit 19.

The microprocessor 11 receives the switch signal SW1, which has been generated from the combination switch 3 and inputted to an input port IN of the power control device 1, via an interface (UF) circuit 11a. The microprocessor 11 outputs a semiconductor relay drive signal RD which is turned on and off in synchronization with the switch signal SW1, as long as the microprocessor is operating normally.

The semiconductor relay 13 supplies the power from the battery B, which has been inputted to a battery port BATT of the power source controller 1, to the load 5 through an output port OUT of the power source controller 1 as long as an internal relay contact (not illustrated) is switched on by ON (input) of a driving signal DR inputted from a backup control circuit 19.

The current sensor circuit 15 detects the current flowing through the load 5 by the power supplied from the battery B through the semiconductor relay 13. The detected current is outputted to the microprocessor 11. As long as operating normally, the microprocessor 11 monitors the inputted current of the load 5 and judges whether or not an abnormal fuse state, such as dead short-circuit or local short-circuit exceeding a constant accumulated time, had occurred. Then, as long as it is judged that the abnormal fuse state has occurred, the microprocessor 11 switches off output of the semiconductor relay drive signal RD and also switches off the power supply to the load 5 through the semiconductor relay 13.

While the input of watchdog pulses WDP, which would be outputted at regular intervals while the microprocessor 11 operates normally, is being interrupted, the watchdog circuit 17 changes output of a reset signal RESET to the microprocessor 11 from normal "off-state" to "on-state" to allow the microprocessor 11 to perform the reset operation. If the watchdog pulses WDP whose input has been interrupted are again inputted due to the reset operation of the microprocessor 11, then the watchdog circuit 17 returns the output of the reset signal RESET from "on-state" mode to "off-state".

The backup control circuit 19 includes an inverter 19a for inverting the active-low (on: low level) reset signal RESET, an AND gate 19b, and an OR gate 19c. To the AND gate 19b, there are inputted an ignition (IG) signal SWIG which has been outputted from an ignition switch (second switch) 7 and inputted to an ignition port IG, and an output which has been generated from the inverter 19a. An output of the AND gate 19b is inputted to the OR gate 19c, together with the semiconductor relay drive signal RD from the microprocessor 11.

Figure 2:
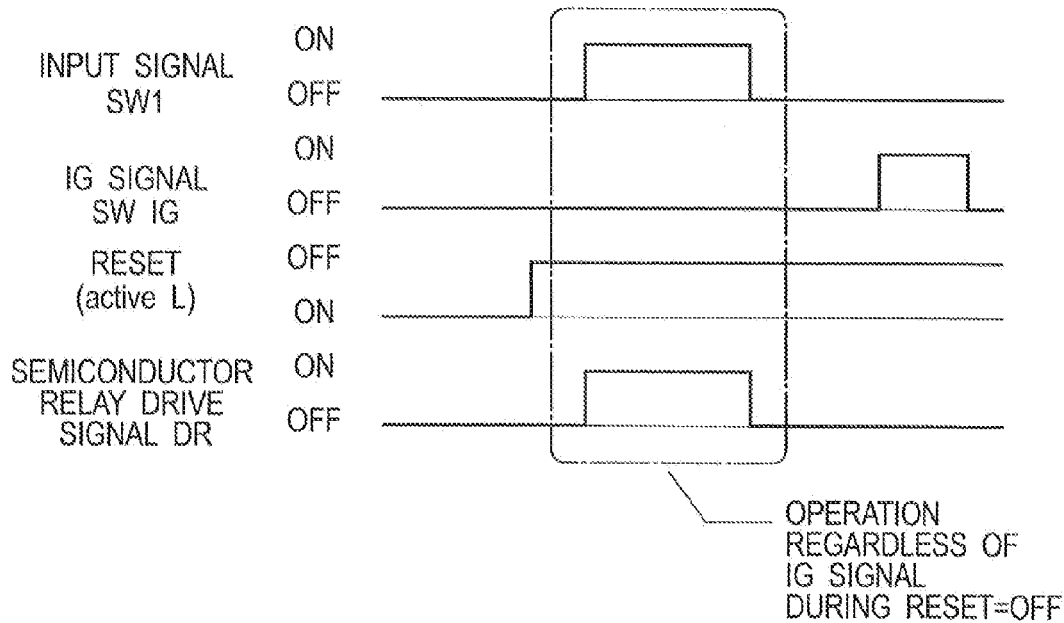
FIG. 2 is a timing chart illustrating the relationship between on/off states of respective signals when a control unit of FIG. 1 is in a normal condition and switching-on/off states of the power supply to a load.

Thus, the drive signal DR outputted from the OR gate 19c of the backup control circuit 19 is switched on and off in synchronization with the semiconductor relay drive signal RD from the microprocessor 11 while the output of the reset signal RESET is turned off (i.e. while the microprocessor 11 is operating normally.). That is, unless the abnormal fuse state occurs, the drive signal DR is turned on and off in synchronization with the operation to turn on and off the combination switch 3, as illustrated with the timing chart of FIG. 2. To the contrary, when the abnormal fuse state is occurring, the drive signal DR is always turned off.

Figure 3:
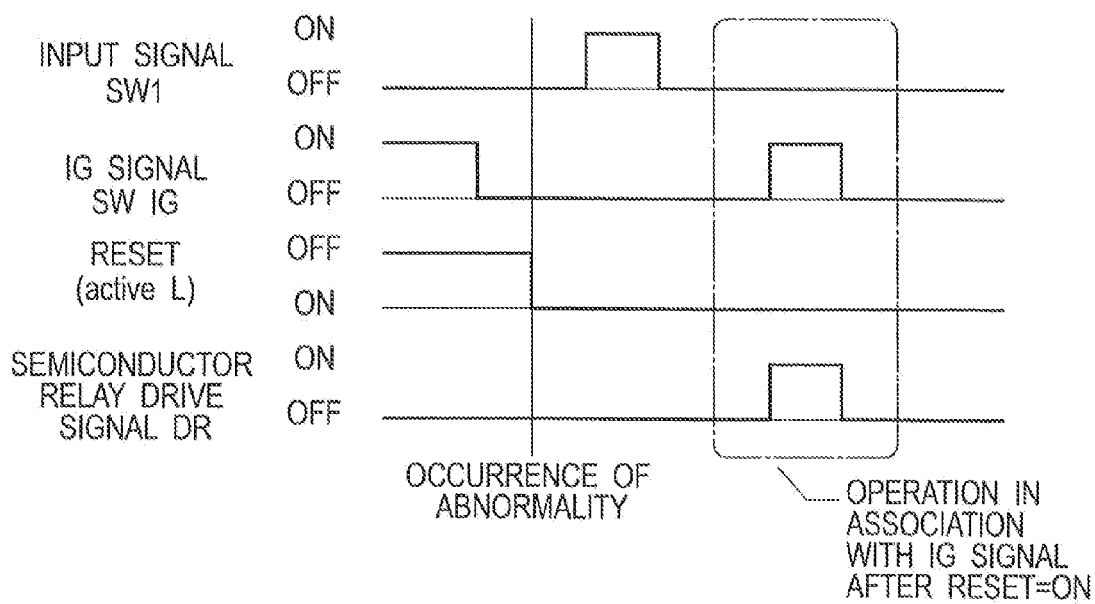
FIG. 3 is a timing chart illustrating the relationship between the on/off states of respective signals when the control unit of FIG. 1 is in an abnormal condition and the switching-on/off states of the power supply to the load

On the other hand, during the "on-state" of the reset signal RESET (during the occurrence of an abnormality in the operation of the microprocessor 11), as illustrated with the timing chart of FIG. 3, the driving signal DR is turned on and off in synchronization with the ignition (IG) signal SWIG from the ignition switch 7.

Therefore, if the microprocessor 11 has an abnormality in operation so as to disenable the abnormal fuse state to be determined by the current of the load 5 detected by the current sensor circuit 15, it is performed to preclude the possibility of operating the combination switch 3 corresponding to the load 5 to switch on and off the power supply to the load 5, but instead allow the possibility of operating the ignition switch 7 to switch on and off the power supply.

Consequently, it is possible to prevent the power supply to the load 5 from being continued since the combination switch 3 is turned on when the microprocessor 11 has an abnormal operation and consequently, it is possible to suppress battery exhaustion. Additionally, as the power supply to the load 5 cannot be switched on and off by the operation of the combination switch 3 when the microprocessor 11 has an abnormal operation, it is possible to allow an operator of the combination switch 3 to recognize such a situation that the microprocessor 11 has an abnormal operation, easily.

For this reason, in realizing the fuse function using the semiconductor relay 13, it is possible to guarantee both prevention of battery exhaustion and easy recognizability for the occurrence of an abnormal operation of the vehicle (the microprocessor 11).

It is noted that the switch to be operated to switch on and off the power supply to the load 5 when the microprocessor 11 has an abnormal operation is not limited to only the ignition switch 7 of this embodiment and any switch would be acceptable as long as it is other than the combination switch 3.

Then, the ignition switch 7 is a switch to be turned on in advance for the purpose of establishing such a condition that the power supply to the load 5 can be switched on and off by the operation of the combination switch 3, in other words, the ignition switch 7 is a switch having relevancy to the load. For this reason, this switch has an advantage that it is easy for an operator to recall it as a switch to be operated in place of the combination switch 3 when the microprocessor 11 has an abnormality in operation.

Also, although the semiconductor relay 13 is assumed as a semiconductor switching element in the embodiment, there may be adopted a semiconductor switching element other than the semiconductor relay 13, for example, a power semiconductor switch or the like.

What is claimed is:

1. A vehicular power source controller, comprising:
   a semiconductor switching element for switching on and off of supplying power from a power source of a vehicle to a load of the vehicle;
   a control unit configured to:
      turn on and off the semiconductor switching element based on a switch signal inputted in association with an operation of a first switch compatible with the load of the vehicle, thereby switching on and off of supplying the power from the power source of the vehicle to the load; and
      turn on and off the semiconductor switching element independently of the switch signal when a current flows through the load in an abnormal fuse state where supplying the power the load has to be suppressed, thereby suppressing supplying the power the load; and
   a backup control circuit configured to turn on and off the semiconductor switching element in synchronization with turning-on/off of a second switch incompatible with the load, based on an other switch signal which is inputted in association with an operation of the second switch when the control unit has an abnormality in operation, thereby switching on and off of supplying the power to the load.

2. The vehicular power source controller of claim 1, wherein
   the second switch is an ignition switch of the vehicle, and
   the backup control circuit is configured to turn on and off the semiconductor switching element in synchronization with turning-on and off of the ignition switch, based on an ignition switch signal which is inputted in association with the operation of the ignition switch.

* * * * *